United States Patent [19]
Roinestad

[11] 3,920,117
[45] Nov. 18, 1975

[54] WIRE CONVEYOR BELT

[75] Inventor: Gerald C. Roinestad, Winchester, Va.

[73] Assignee: Ashworth Bros., Inc., Fall River, Mass.

[22] Filed: Apr. 23, 1974

[21] Appl. No.: 463,416

[52] U.S. Cl. .................. 198/194; 74/239; 198/181; 198/193
[51] Int. Cl.² ......................................... B65G 15/54
[58] Field of Search .......... 198/181, 193, 189, 194, 198/195; 74/239

[56] References Cited
UNITED STATES PATENTS

| | | | |
|---|---|---|---|
| 2,214,739 | 9/1940 | Guba | 198/193 |
| 2,769,531 | 11/1956 | Guba | 198/193 X |
| 3,225,898 | 12/1965 | Roinestad | 198/181 |
| 3,263,799 | 8/1966 | Bascom | 198/193 |
| 3,542,188 | 11/1970 | Kinney | 198/193 |
| 3,563,366 | 2/1971 | Daringer | 198/193 |
| 3,620,356 | 11/1971 | Poerink | 198/193 |
| 3,731,894 | 5/1973 | Curran | 198/193 X |
| R27,690 | 7/1973 | Roinestad | 198/181 X |

Primary Examiner—Evon C. Blunk
Assistant Examiner—James L. Rowland
Attorney, Agent, or Firm—Schuyler, Birch, Swindler, McKie & Beckett

[57] ABSTRACT

A wire conveyor belt formed of a plurality of interconnected wire links of generally flat helical configuration with one surface of each link defined by a plurality of elongated connective portions extending across the link between spaced arcuate end portions, and the other, generally opposed surface of the link being defined by a pluality of generally U-shaped connective portions extending between the arcuate end portions and defining a channel extending along the link with the base of the channel extending inwardly toward the other surface, the links being pivotally interconnected by a plurality of connective cross members extending across the belt through the arcuate end portions.

11 Claims, 6 Drawing Figures

WIRE CONVEYOR BELT

BACKGROUND OF THE INVENTION

This invention relates to wire conveyor belts and more particularly to conveyor belts wherein at least one surface is a supportive surface.

Wire conveyor belt systems are widely used in a great variety of industrial fields. The conveyor belts used with such systems have generally taken the form either of a plurality of interwoven and generally flat helical links, of a plurality of interconnected flat wire links wherein the links are configured as alternating U-shaped members, as in Roinestad et al U.S. Pat. No. Re. 27,690, or a grid in the form of a plurality of transverse rods the ends of which are interconnected by tractive chain links, as in Roinestad U.S. Pat. No. 3,225,898. While these known configurations are highly suitable for numerous uses, certain requirements and uses have posed substantial problems. For example, to convey small items such as fasteners or processed vegetable pieces, it is necessary to have a relatively fine mesh, thus rendering the common flat wire belts and grid-type belts unsuitable for such applications. While the use of flat helical woven belts or flat helical mesh woven onto grid-type belts may overcome some of these deficiencies by providing a reasonably fine mesh, such constructions may still present substantial problems for certain applications.

Problems associated with the use of flat helical woven belts or flat helical mesh woven onto grid belts frequently have centered upon the inherent existence of a cavity of hold within each link, formed by the opposing flat faces of the helix and the connective members extending through the end portions of such flat helixes. In belt structures having such cavities within the links it is possible for a relatively small diameter elongated item, e.g., a green bean or a threaded fastener, to slip into such cavity and become trapped within, thus presenting an unsanitary condition or possibly damaging the belt. One technique for avoiding this problem has been the use of a more tightly wound helix to provide a finer mesh. This approach, however, consumes much greater amounts of wire for a belt of given dimensions and renders such a belt both more costly and heavier than desirable, requiring heavier components to support the belt and more power to operate it.

SUMMARY OF THE INVENTION

The present invention provides a wire conveyor belt which overcomes many of the problems of the prior art. The configuration of the mesh of the supportive surface formed by the interconnected links of the belt of this invention is effectively much finer than the mesh formed by a conventional belt of flat helical links of similar dimensions. Additionally, no substantial cavity is formed within the flat helical links, thus effectively preventing the trapping of small diameter, elongated conveyed items within the belt structure.

Briefly, the invention contemplates a wire conveyor belt comprising a plurality of interconnected wire links each forming a generally flat helix extending across the belt in a plurality of flat loops defining opposed faces of the link with the faces generally parallel to the path of travel of the belt, and each of the links including a plurality of arcuate end portions at spaced locations along the link on both sides of the link, with a plurality of elongated connective portions extending across the link at spaced locations on both faces of the link to join the end portions, the connective portions on one face of the link being generally U-shaped to define a channel extending along the link with the base of the channel extending inwardly toward the other face of the link. The wire links are pivotally interconnected by a plurality of connective cross members extending across the belt through the end portions of the links.

The generally flat helical links of the wire conveyor belt constructed in the manner of this invention will have either no cavity centrally disposed within the helix, or, at most, a cavity of greatly reduced size, thus substantially eliminating the possibility of trapping small items within the belt. In addition, the effective mesh size of the supportive surface of this belt may be substantially smaller than the mesh size of a conventionally formed flat helical link conveyor belt of similar dimensions and thus may provide an improved supportive capability.

With the foregoing in mind, it is an object of the present invention to provide a wire conveyor belt having two generally opposed faces and comprising interconnected flat helical links having improved article supportive characteristics, wherein the configuration of the links effectively precludes the lodging of a conveyed article between the faces of the belt.

This and other objects of the invention will become apparent from a consideration of the detailed description of preferred embodiments thereof given in connection with the following drawings.

DESCRIPTION OF PREFERRED EMBODIMENTS

Figure 1:
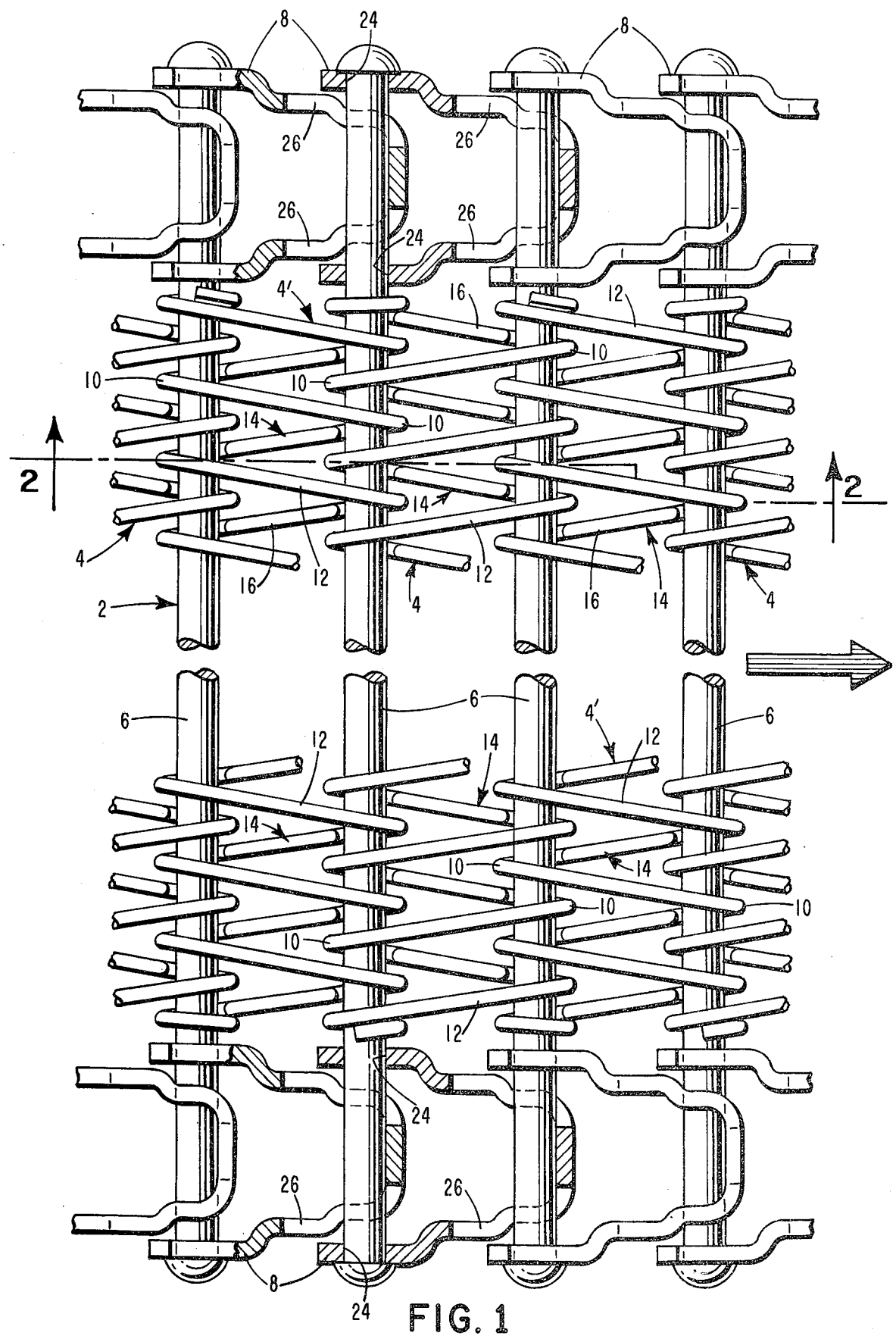
FIG. 1 is a plan view of one embodiment of the wire conveyor belt of the invention.
Figure 2:
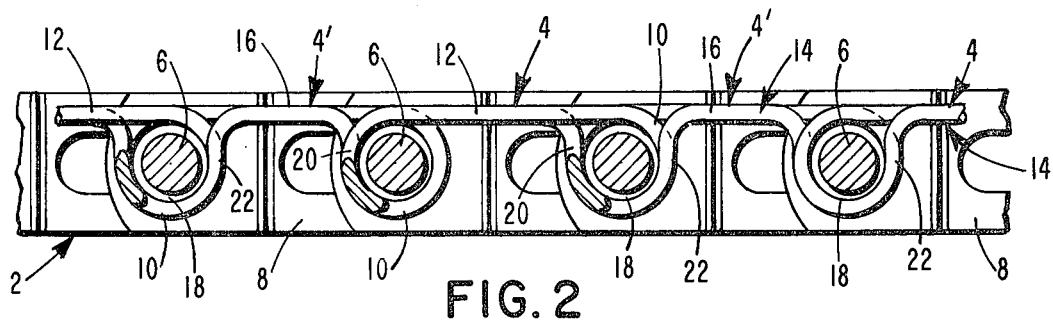
FIG. 2 is a side sectional view of the wire conveyor belt of this invention taken along line 2—2 of FIG. 1.

One preferred embodiment of the wire conveyor belt of this invention is designated in FIGS. 1 and 2 by the reference numeral 2. Basically, this conveyor belt 2 comprises a plurality of transversely disposed wire links 4 and 4' interconnected by cross members 6. Conveniently, tractive links 8 of a driving chain may be provided adjacent the outer extremities of connective members 6 to engage drive sprockets (not shown) for driving the conveyor belt 2.

For practical convenience and to promote true running of the belt, alternate links 4 and 4' are helically wound in opposite directions, thus providing balanced winding for the belt. Since the general configuration of wire links 4 and 4' is identical except for the direction of helical winding, links 4 will be described below as representative of both wire links 4 and 4'.

Wire links 4 are each fabricated from a continuous length of wire, preferably of round cross section, and extend substantially the full width of the belt between tractive links 8. Each link 4 extends across the belt in a helically wound series of generally flat spaced loops with the outer portions of the generally flat sections defining the opposing faces of the belt 2. The helical structure of each of these wire links 4 is defined by arcuate end portions 10 located at each end of each loop of the helix and the connective portions 12 and 14 extending between the arcuate end portions 10. Connective portions 12 of this embodiment are essentially linear and extend tangentially between the arcuate end portions 10 and form the supportive surface of the belt 2, all such connective portions 12 of a given link being co-planar with one another. The other connective portions 14 of each link are generally U-shaped (of downwardly facing orientation of FIG. 2) with such U-shaped connective portions 14 of each link extending toward the supportive surface formed by the other connective portions 12 of the link 4. Thus, the U-shaped connective portions 14 of the link define an inverted channel, the base of which is defined by the base 16 of the U-shaped connective portion 14 and the sides of which are defined by the legs 20 and 22 of the U-shaped portion, along the underside of the link 4, as shown in FIG. 2.

Flat helical conveyor belt links configured according to the prior art teachings, wherein the arcuate end portions are joined by tangential and generally linear connective portions, would provide a cavity within each link defined on two opposing sides by the linear tangential connective portions, on two other opposing sides by the connective cross members and extending along the length of the helix, and within which cavity a small diameter elongated conveyed article could become trapped. In contradistinction thereto, the links 4 of the conveyor belt 2 of this embodiment of the invention provide no such disadvantageous cavity.

FIG. 2 illustrates how the provision of the U-shaped connective portions 14 effectively eliminates any such cavity. In the embodiments of FIGS. 1 and 2 the bases 16 of the U-shaped connective portions 14 extend upwardly toward the elongated and essentially linear connective portions 12 to an extent to render the bases 16 substantially co-planar with the elongated connective portions 12. Also it can be seen in this embodiment that the bases 16 of the U-shaped connective portions 14 are substantially flat and elongated and, being disposed essentially co-planar with the connective portions 12, serve effectively to provide a finer mesh on the face of the belt formed by the connective portions 12. Thus, the U-shaped connective portions 14 serve to provide additional support for the planar surface of each link 4 defining a supportive face of the conveyor belt 2.

The surface defined by the bases 16 of the U-shaped connective portions 14 is preferably coextensive and contiguous to the surface formed by the connective portions 12, a surface generally tangent to the arcuate end portions 10. In FIG. 2, the bases 16 and the connective portions 12 are shown precisely in the same plane. Alternatively and with similar resulting performance, the bases 16 and portions 12 could be displaced slightly from one another, with that surface defined by the U-shaped connective portion bases 16 being either slightly above or slightly below that surface defined by connective portions 12. Moreover, the supportive surfaces defined by connective portions 12 of the link 4 and the bases 16 of U-shaped connective portions 14 may be other than tangential to the arcuate end portions 10, e.g., displaced inwardly of the link to form a second, upwardly open channel for conveying articles held therein.

Another feature of the conveyor belt 2 of FIGS. 1 and 2 is its self-cleaning action, which results from the configuration and dimensions given the openings 18 in the ends of the links 4 through which connective cross members 6 extend. As seen in FIG 2, the arcuate end portions 10, the connective portions 12 extending tangentially from one side thereof and the leg portions 20 and 22 of U-shaped connective portions 14 define substantially circular openings 18 through which the connective cross members 6 extend. The diameter of such substantially circular openings 18 is slightly larger than the diameter of connective cross members 6 and is selected to permit a predetermined amount of free play between the openings 18 and the respective connective cross members 6 positioned therein, thus permitting a small amount of flexing and mutual collapsing of the links toward one another during the travel of the belt 2. Such flexing and partial collapsing of the belt 2 tends to free small particles which may become trapped within the mesh of the belt, thus assisting in rendering the belt 2 self-cleaning during its travel.

The conveyor belt 2 of the embodiment of FIGS. 1 and 2 is illustrated as also including tractive members 8 receiving the outer extremities of connective cross members 6 to form a drive chain for driving the belt. This drive chain may be of any suitable configuration, such as conventional roller chain; however, for this embodiment the drive chains are preferably of the configuration disclosed in Roinestad, U.S. Pat. No. 3,225,898, wherein connective cross members 6 extend through round and closely fitting holes 24 in one link and through elongated slotted openings 26 in the adjacent, connected link. These slotted openings 26 provide for a substantial measure of collapsibility of the tractive links toward each other in the plane of the belt, in this case to facilitate the self-cleaning action described above. Clearly, slotted openings 26 may, if desired, be replaced by circular holes of a diameter substantially equal to or greater than that of the end portions of wire links 4 with substantially similar effects. Likewise, closely fitting holes 24 may be similarly enlarged with similar results. Alternatively, if no collapsibility of the belt 2 is desired, holes 24 and openings 26 may be dimensioned to permit only pivotal movement with no substantial free play of connective cross members 6 with respect thereto.

Figure 3:
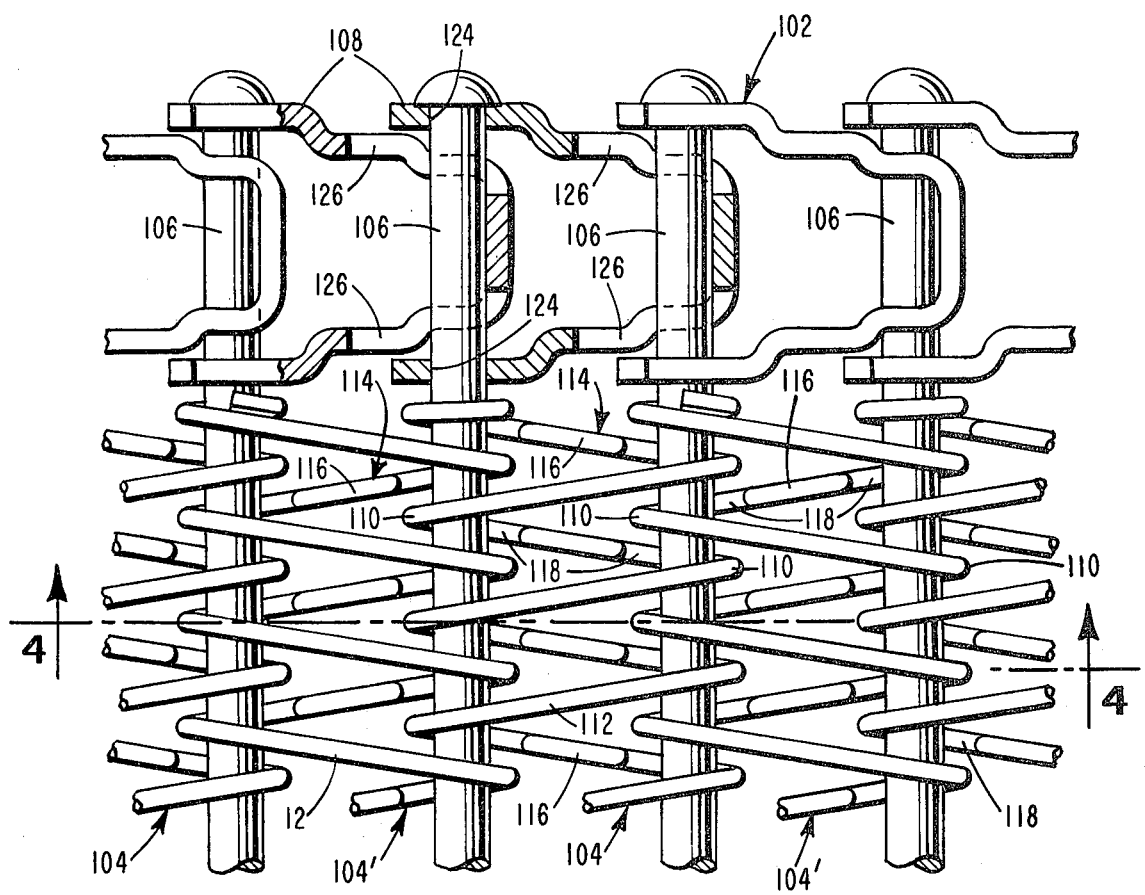
FIG 3 is a plan view of another embodiment of the wire conveyor belt of this invention wherein is provided for partial collapsing of the links thereof.
Figure 4:
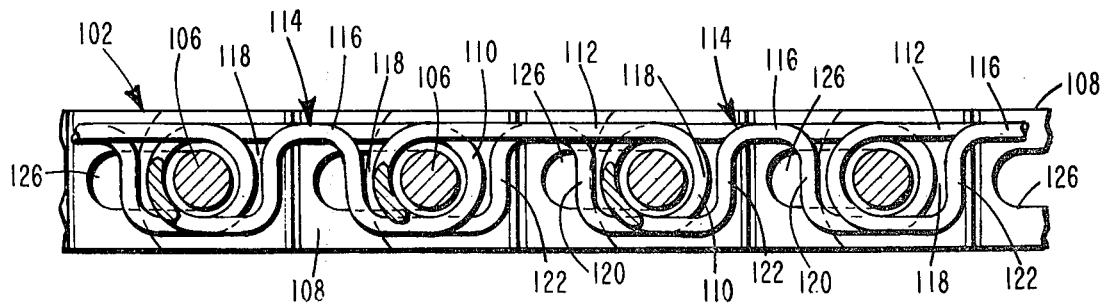
FIG. 4 is a side sectional view of the wire conveyor belt of FIG. 3 taken along line 4—4 thereof.

FIGS. 3 and 4 illustrate a modification of the conveyor belt of FIGS. 1 and 2 wherein provision is made for a greater amount of mutual collapsibility of the links toward one another in the plane of the belt. Such a configuration is desirable where it is necessary for the conveyor belt to negotiate lateral turns during the course of its travel. Since the structure of belt 102 of FIGS. 3 and 4 is substantially similar to that of conveyor belt 2 of FIGS. 1 and 2, like components of these two belts are numbered alike in hundred and unit series respectively.

The principal difference between conveyor belt 2 of FIGS. 1 and 2 and conveyor belt 102 of FIGS. 3 and 4 is the shortened base 116 of the U-shaped connective portions and the reconfiguration of legs 120 and 122 into generally an L-shape with one portion of the L extending toward and joined to base 116 and the other portion of the L extending tangentially from arcuate end portions 110 in a direction generally parallel to the bases 116 of U-shaped portions 114 and also generally parallel to connective portions 112. This leg configuration, in addition to defining a narrower channel along the link, also provides openings in the form of elongated slots 118 in the end portions of the links, such slotted openings 118 being defined by the arcuate end portions 110, part of connective portions 112, and the generally L-shaped legs 120 and 122 of the U-shaped connective portions 114, through which slots connective cross members 106 may extend. Such slotted openings 118 thus provide for substantial collapsing of the conveyor belt links 104 toward one another in the plane of the belt 102 to facilitate lateral flexing thereof while still restricting the size of any cavity formed between the belt surfaces.

If the conveyor belt 102 is provided with the driving chain comprising tractive links of the configuration disclosed fully in Roinestad, U.S. Pat. No. 3,225,898, and described above, a substantial degree of collapse may be afforded the conveyor belt 102 by virtue of the mutual collapse of the links toward one another, thus facilitating lateral flexing and negotiation of lateral turns during the travel of the belt 102.

Figure 5:
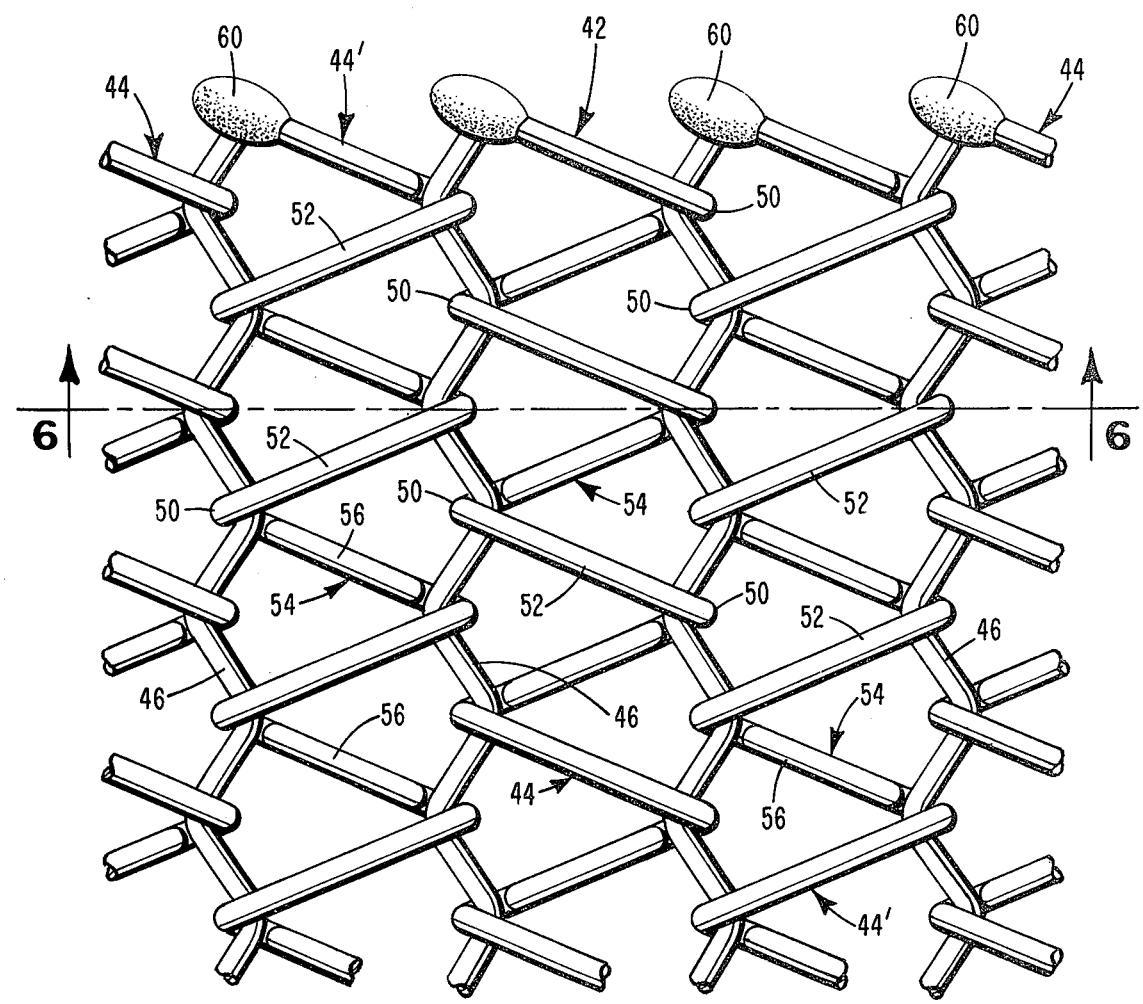
FIG. 5 is a plan view of an embodiment of the wire conveyor belt of this invention featuring balanced weave construction.
Figure 6:
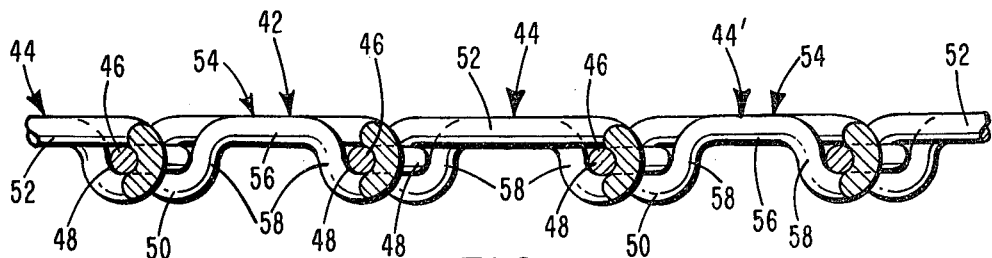
FIG. 6 is a side sectional view of the wire conveyor belt of FIG. 5 taken along line 6—6 thereof.

FIGS. 5 and 6 illustrate another embodiment of this invention in the form of a balanced weave conveyor belt 42. Conveyor belt 42 comprises essentially a plurality of generally flat adjacent helical links 44 and 44', with such adjacent links being of opposite helical winding to provide a balanced belt. Adjacent links are joined together by connective cross members 46 which extend through openings 48 provided adjacent end portions 50 of links 44 and 44'. Generally as described with respect to conveyor belt 2 of FIGS. 1 and 2, the generally flat helical links 44 and 44' of conveyor belt 42 comprise generally opposed arcuate end portions 50 joined by elongated connective portions 52 comprising one surface of the belt 42 and U-shaped connective portions 54, the bases 56 of which define the other surface of belt 42 in the form of a U-shaped channel. Such channel is defined by U-shaped connective portion base 56 with U-shaped connective portion legs 58 extending downwardly therefrom. Conveniently, the lateral extremities of this belt may be formed by weldments 60 joining each end of connective links 44 and 44' to their immediately adjacent respective cross members 46, as illustrated in FIG. 5. For such a balanced weave conveyor belt 42 generally no provision is made for a drive chain extending along an edge thereof, in contradistinction to the structure of conveyor belts 2 and 32. Thus, such a balanced weave conveyor belt 42 may conveniently be driven by a powered friction roller engaging the belt at one end of its travel. Due to the substantial similarity of this belt to belts 2 and 102, such belt 42 will exhibit substantially the same features and benefits as those belts 2 and 102.

As is apparent from FIGS. 2, 4 and 6, the conveyor belts of each embodiment of this invention may also conveniently be utilized in an inverted orientation, with the channels formed by the U-shaped connective portions facing upwardly, to provide flights for conveying materials along upwardly directed inclines. By virtue of the novel structure of the conveyor belts of this invention, such inverted usage would also enjoy supportive, non-trapping and self-cleaning benefits similar to those described above with respect to such belts when used in their more common, non-inverted manner.

While three embodiments of the conveyor belt of this invention have been shown and described above, numerous other variations which will be apparent to one skilled in the art, are contemplated and included within the scope of the invention. Therefore, the scope of the invention is not to be limited by the illustrative embodiments but is to be limited solely by the scope of the appended claims.

I claim:

1. A wire conveyor belt comprising:
   a plurality of wire links each forming a generally flat helix extending across the belt in a plurality of flat loops defining opposed faces of the links, said faces being generally parallel to the path of travel of the belt, each of said links including
   a plurality of arcuate end portions at spaced locations along the link; and
   a plurality of elongated connective portions extending across the link at spaced locations on both faces of the link to join said end portions, the connective portions on one face of the link being generally U-shaped to define a channel extending along the link with the base of the channel extending inwardly toward the other face of the link; and
   a plurality of connective cross members extending across the belt within the arcs defined by said end portions to pivotally interconnect said wire links.

2. A wire conveyor belt according to claim 1 wherein the bases of said U-shaped connective portions are substantially flat and elongated and disposed substantially co-planar with the connective portions on said other face of the links.

3. A wire conveyor belt according to claim 2 wherein the connective portions on said other face of the links extend in substantially straight lines between said arcuate end portions to define a planar belt face.

4. A wire conveyor belt according to claim 3 wherein said U-shaped connective portions have legs defining on one side thereof the sides of said channels and on the other side thereof defining with said arcuate end portions substantially circular openings receiving said connective cross members and only slightly larger than said cross members to prevent any substantially collapsing of said links toward each other in the plane of the belt.

5. A wire conveyor belt according to claim 3 wherein said U-shaped connective portions have legs defining on one side thereof the sides of said channels and on the other side thereof defining with said arcuate end portions substantially slotted openings receiving said connective cross members to permit substantial collapsing of said links toward each other in the plane of the belt.

6. A wire conveyor belt according to claim 1 wherein the bases of said channels are substantially co-planar with said other face of the links.

7. A wire conveyor belt according to claim 1 further comprising a pair of driving chains, one of said chains being disposed along each side of the belt and including means receiving the respective ends of said connective cross members.

8. A wire conveyor belt according to claim 7 wherein said chain comprises a plurality of edge links and said receiving means provide slotted openings receiving said connective cross members to permit mutual collapse of said edge links toward each other.

9. A wire conveyor belt according to claim 8 wherein said U-shaped connective portions have legs defining on one side thereof the sides of said channels and on the other side thereof defining with said arcuate end portions substantially slotted openings receiving said connective cross members to permit substantial collapsing of said links toward each other in the plane of the belt.

10. A wire conveyor belt according to claim 9 wherein said first and second surfaces lie in a plane substantially tangent to said arcuate end portions.

11. A wire conveyor belt according to claim 1 wherein said connective portions on said other face of the links define a first surface and the bases of said U-shaped connective portion define a second surface coextensive and contiguous to said first surface over a major portion of the width of said links thereby providing no cavity between said first and second surfaces.

* * * * *

UNITED STATES PATENT OFFICE
CERTIFICATE OF CORRECTION

Patent No. 3,920,117            Dated November 18, 1975

Inventor(s) Gerald C. Roinestad

It is certified that error appears in the above-identified patent and that said Letters Patent are hereby corrected as shown below:

In the Claims

Claim 10: renumber as claim 11; at line 1 thereof change "9" to --10--;

Claim 11: renumber as claim 10.

*Signed and Sealed this*

*seventeenth* Day of *February 1976*

[SEAL]

Attest:

RUTH C. MASON
*Attesting Officer*

C. MARSHALL DANN
*Commissioner of Patents and Trademarks*